US012515920B2

(12) United States Patent
Haikonen et al.

(10) Patent No.: US 12,515,920 B2
(45) Date of Patent: Jan. 6, 2026

(54) METHOD FOR CONSTRUCTING AN ELEVATOR

(71) Applicant: KONE Corporation, Helsinki (FI)

(72) Inventors: Aki Haikonen, Helsinki (FI); Mika Ijäs, Helsinki (FI); Anssi Venho, Helsinki (FI); Kai Prusti, Helsinki (FI); Vesa Tiainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/939,082

(22) Filed: Nov. 6, 2024

(65) Prior Publication Data

US 2025/0091837 A1 Mar. 20, 2025

Related U.S. Application Data

(63) Continuation of application No. PCT/FI2022/050360, filed on May 24, 2022.

(51) Int. Cl.
*B66B 19/00* (2006.01)
*B66B 19/02* (2006.01)

(52) U.S. Cl.
CPC ............ *B66B 19/00* (2013.01); *B66B 19/002* (2013.01); *B66B 19/005* (2013.01); *B66B 19/02* (2013.01)

(58) Field of Classification Search
CPC ..... B66B 19/00; B66B 19/002; B66B 19/005; B66B 19/02; B66B 11/08; B66B 7/08; B66B 7/1246; B66B 11/0005
See application file for complete search history.

(56) References Cited

U.S. PATENT DOCUMENTS 5,076,398 A * 12/1991 Heikkinen .............. B66B 11/08 187/266
2014/0138189 A1* 5/2014 van der Meijden .. B66B 7/1246 187/406
2021/0130131 A1* 5/2021 Korvenranta ............. B66B 7/08

FOREIGN PATENT DOCUMENTS

DE 26 35 877 A1 2/1978
DE 2651566 A1 5/1978
EP 3 747 820 A1 12/2020

(Continued)

OTHER PUBLICATIONS

International Search Report (PCT/ISA/210) issued in PCT/FI2022/050360, dated Nov. 23, 2022.

(Continued)

*Primary Examiner* — Lee A Holly
(74) *Attorney, Agent, or Firm* — Birch, Stewart, Kolasch & Birch, LLP

(57) ABSTRACT

A method for constructing an elevator into a destination location from a plurality of prefabricated elevator modules includes fabricating a plurality of elevator modules, in particular at a location apart from said destination location. The fabricating includes providing one or more module frames having a longitudinal axis; positioning one or more of the module frames in horizontally oriented position, wherein in the horizontally oriented position the longitudinal axis is horizontal; and while the one or more module frames are in the horizontal position, performing installation work on said one or more module frames. The method includes arranging the modules into the destination location on top of each other such that said modules are in a vertically oriented position.

18 Claims, 10 Drawing Sheets

(56) References Cited

FOREIGN PATENT DOCUMENTS

| | | | | | |
|---|---|---|---|---|---|
| GB | 2600153 A | * | 4/2022 | ............. | B66B 19/00 |
| WO | WO 2022/084294 A1 | | 4/2022 | | |

OTHER PUBLICATIONS

Written Opinion of the International Searching Authority (PCT/ISA/237) issued in PCT/FI2022/050360, dated Nov. 23, 2022.

* cited by examiner

METHOD FOR CONSTRUCTING AN ELEVATOR

CROSS REFERENCE TO RELATED APPLICATIONS

This application is a Continuation of PCT International Application No. PCT/FI2022/050360, filed on May 24, 2022, which is hereby expressly incorporated by reference into the present application.

FIELD OF THE INVENTION

The invention relates to a method for constructing an elevator into a destination location from a plurality of prefabricated elevator modules.

BACKGROUND OF THE INVENTION

Conventionally, elevators have been built by installing components one by one into a hoistway. A drawback has been that all elevator installation work taking place at the construction site consumes time and complicates logistics of the construction site. A drawback has also been that accurate positioning of components has required lots of adjustment at the site causing delays on subsequent steps of the elevator construction as well as on steps of construction of other parts of the building. Also, modular elevator solutions are known, where an elevator is built from prefabricated modules. Modular elevator solutions have involved building prefabricated elevator modules at factory, transporting them to the construction site, and piling them on top of each other into the desired destination location e.g. inside a building.

Such modular solutions exist where the prefabricated modules comprise a pit module, a top module comprising a machinery for driving a hoisting roping, and one or more intermediate modules between the pit module and the top module. Each module can comprise a module frame and in said piling said plurality of prefabricated modules are piled on top of each other such that the frame of each prefabricated module carries the weight of the frame of the module piled on top of it. The pit module rests on a floor of the building. A solution of the above-described kind is disclosed in document EP3747820 A1. In one of the disclosed solutions, the module frames of the modules can be beam frames. In this kind of modular solution, the modules can be prefabricated to high accuracy already at the factory, which makes the piling process very swift. In prior art solutions of this kind there has been only little adjustment work on site after said piling. However, it has been noticed that the construction work can still be improved in terms of one or more of: efficiency of fabrication work of the modules at the factory, simplicity and time consumption of the steps that need to be performed at the construction site for achieving good accuracy of component placement, accuracy of placement of parts of the final elevator.

BRIEF DESCRIPTION OF THE INVENTION

The object of the invention is to introduce an improved method for constructing an elevator into a destination location from a plurality of prefabricated elevator modules.

An object is particularly to introduce a solution by which one or more of the above mentioned problems of prior art and/or drawbacks discussed or implied elsewhere in the description can be solved.

With the method, fabrication of elevator modules can be performed with high accuracy, efficiency and ergonomy. Accuracy of fabrication of the modules can be improved with the method such that the work to be performed later at the construction site is simplified and reduced. Thus, only small amount of time and work is needed at the construction site, which reduces disturbance caused on other operations taking place at the construction site and its surroundings.

It is brought forward a new method for constructing an elevator into a destination location from a plurality of prefabricated elevator modules. The method comprises fabricating plurality of (prefabricated) elevator modules at a location apart from said destination location, such as at a factory. The fabricating comprises providing one or more module frames having a longitudinal axis; and positioning one or more of the module frames in horizontally oriented position, where in said horizontally oriented position the longitudinal axis is horizontal; and while the one or more module frames are in horizontal position performing installation work on said one or more module frames.

After said fabricating, the method comprises transporting the modules to proximity of the destination location; and arranging the modules into the destination location on top of each other such that said modules are in vertically oriented position, where in said vertically oriented position the longitudinal axes of the module frames of the modules are vertical.

With this kind of solution one or more of the above-mentioned objects can be achieved. The module frame(s) to be worked on while in horizontally oriented position are easily accessible from various directions, in particular from end directions and from side directions so that installation work can be performed accurately, efficiently and ergonomically. In particular, this facilitates accuracy, efficiency and ergonomics of mounting of parts on the frame(s), adjustment of positions of beams of the frame(s), accurate alignment of parts to be fixed on the frame(s).

Preferable further details of the method are introduced in the following, which further details can be combined with the method individually or in any combination.

In a preferred embodiment, each said module frame is a beam frame. A beam frame can be formed rigid and having good load bearing abilities yet relatively lightweight to be moved as large modules. Preferably, each said module frame comprises four corner beams, in particular for forming corner beams of the modules. The corner beams of a module frame extend in direction of the longitudinal axis of the module frame in question. Preferably, each said module frame comprises cross beams connecting the corner beams to each other, most preferably such that each said corner beam is connected to two other corner beams by plurality of cross beams. Preferably, although not necessarily, the cross beams extend at right angle relative to the corner beams. Preferably, although not necessarily, each said module frame comprises one or more diagonal beams each diagonal beam connecting a cross beam and a corner beam, and extending in the plane of the cross beam and a corner beam at an angle, preferably at angle 20-70 deg, relative to both of the beams it connects.

In a preferred embodiment, the aforementioned beams are metal beams. The metal beams are preferably tubular metal beams. Hereby, the beam frame is rigid and light whereby large modules can be formed and lifted into place. This structure also reduces forces to be beared when piled, whereby a high pile of modules is possible. Preferably, the beams have one or more, preferably four planar side faces. Generally, the beams preferably have one or more planar side faces, such as four planar side faces, whereby fixing elevator components to them is facilitated.

In a preferred embodiment, in said positioning two of the module frames are positioned in horizontally oriented position, and the fabricating comprises thereafter connecting to each other said two module frames end to end while they are in horizontal position, and thereafter installation work is performed on one or both of said two module frames while they are in horizontal position and connected. The fabricating preferably thereafter comprises disconnecting said two module frames from each other. Performing installation work on one or both of said two module frames while they are connected is advantageous, because thus the installation work on a module frame can be performed in context where another module frame is present as it is intended to be also in the final configuration to be constructed. Hereby, for instance the parts of the module frames and parts to fixed on them can be positioned accurately relative to each other at an early stage and adjustment work required to be done at the site is reduced.

In a preferred embodiment, the arranging comprises connecting successive modules to each other, said connecting successive modules to each other comprising reconnecting to each other two module frames end to end while they are in vertical position, which two module frames were earlier connected during fabricating of the plurality of modules.

In a preferred embodiment, said module frames comprise a pit module frame, at least one intermediate module frame and a top module frame, and said elevator modules comprise a pit module comprising a pit module frame, at least one intermediate module comprising an intermediate module frame and a top module comprising a top module frame, and in said arranging the modules are arranged into the destination location on top of each other such the at least one intermediate module is/are on top of the pit module and the top module is on top of the at least one intermediate module.

In a preferred embodiment, in said arranging the modules are arranged into the destination location on top of each other such that the corner beams of each module are aligned with corner beams of other modules, preferably such that the corner beams of the top module rest on the corner beams of an intermediate module, and the corner beams of an intermediate module rest on the corner beams of the pit module.

In a preferred embodiment, the installation work performed on said one or more module frames while the one or more module frames are in horizontal position comprises adjusting positions of corner beams of a module frame relative to each other and/or relative to corner beams of another module frame connected to the module frame in question.

In a preferred embodiment, said adjusting positions of corner beams is performed such that cross dimensions of corner beams of a module frame are changed, most preferably such that their length difference is reduced.

In a preferred embodiment, said adjusting positions of corner beams comprises adjusting position of one or more corner beams such that corner beams become parallel or within a tolerance away from parallel. Preferably, said adjusting positions of corner beams is performed by aid of a laser device emitting a laser ray.

In a preferred embodiment, the installation work on one or both of said two module frames while they are in horizontal position and connected comprises fixing on at least one of the module frames elevator parts such that they are aligned with corresponding elevator parts fixed to another module frame connected to the module frame in question. Preferably, said elevator parts include one or more of: guide rail brackets for guide rails; car guide rails; counterweight guide rails; landing door structures such as in particular landing door frame parts and/or landing door leaves.

In a preferred embodiment, said fixing is performed by aid of a laser device emitting a laser ray.

In a preferred embodiment, the installation work performed on one or both of said two module frames while they are in horizontal position and connected comprises making aligned markings on the module frames to plurality of positions for indicating intended locations of elevator parts to be fixed on the module frames.

In a preferred embodiment, each said connecting of two module frames to each other end to end is performed by aid of shape-locking connecting means, which shape locking connecting means are provided at ends of the two module frames to be connected. Said shape locking means preferably comprise one or more rods at an end of one of the module frames to be connected and protruding in direction of said longitudinal axis of the module frame in question as well as apertures at an end of the other of the module frames to be connected, which apertures open in direction of said longitudinal axis of the module frame in question. Preferably, the shape-locking connecting means are provided at ends of corner beams of the two module frames to be connected.

In a preferred embodiment, the installation work comprises fixing on a module frame while it is in horizontal position one or more of:

- a hoisting machine unit comprising at least a hoisting machine and preferably also a car guide rail section, the hoisting machine preferably comprising drive sheave for engaging hoisting ropes and an electric motor for driving the drive sheave; and/or
- rope end fixing brackets.

In a preferred embodiment, the installation work comprises mounting a counterweight frame on a module frame, which is preferably the pit module frame, while the module frame is in horizontal position, in particular on guide rails fixed to the module frame.

In a preferred embodiment, the fabricating comprises assembling on a module frame, which is preferably a pit module frame, while the module frame is in vertical position, an elevator car, such that it is mounted on guide rails fixed to the module frame.

In a preferred embodiment, the method comprises after fabricating of a module, and before transportation of the module:

- tying for the time of transportation elevator parts of the module to the module frame of the module with tying means s such as straps or braces for ensuring they are immovable relative to each other during transport; and/or
- tying for the time of transportation beams of the module to each other with tying means s such as straps or braces for ensuring they are immovable relative to each other during transport.

In a preferred embodiment, the method comprises, preferably after said arranging, roping the elevator. This is performed preferably such that a car and counterweight are suspended by hoisting ropes, which pass around a drive sheave.

In a preferred embodiment, the elevator constructed is an elevator for transporting passengers and/or goods. For facilitating safe transporting in the method the elevator is constructed to comprise an elevator car having an inside space for receiving passengers and/or goods, a doorway leading into the interior, and a door movable to open and close the doorway.

In a preferred embodiment, the destination location is a space inside a building.

In a preferred embodiment one of the elevator modules, preferably the pit module, comprises an elevator car. The elevator car has an inside space for receiving passengers and/or goods, and comprises a doorway leading into the interior, as well as a door movable to open and close the doorway.

In a preferred embodiment one of the elevator modules, preferably the top module, comprises a hoisting machine. The hoisting machine preferably comprises a drive sheave for engaging hoisting ropes and an electric motor for driving the drive sheave.

BRIEF DESCRIPTION OF THE DRAWINGS

In the following, the present invention will be described in more detail by way of example and with reference to the attached drawings, in which.

DETAILED DESCRIPTION

FIGS. 1-20 illustrate phases of a method according to an embodiment, where an elevator is constructed into a destination location L from a plurality of prefabricated elevator modules A,B,C.

The method comprises fabricating (also referred to as prefabricating) plurality of elevator modules A,B,C, in particular at a location, which is apart from said destination location L, such as at factory. Hereby, they can need not be fabricated on site where working conditions may not be optimal, but in an environment and conditions which can be optimized more freely to support accuracy, efficiency and ergonomy of the installation work. This fabricating is illustrated in FIGS. 1-16.

Figure 1:
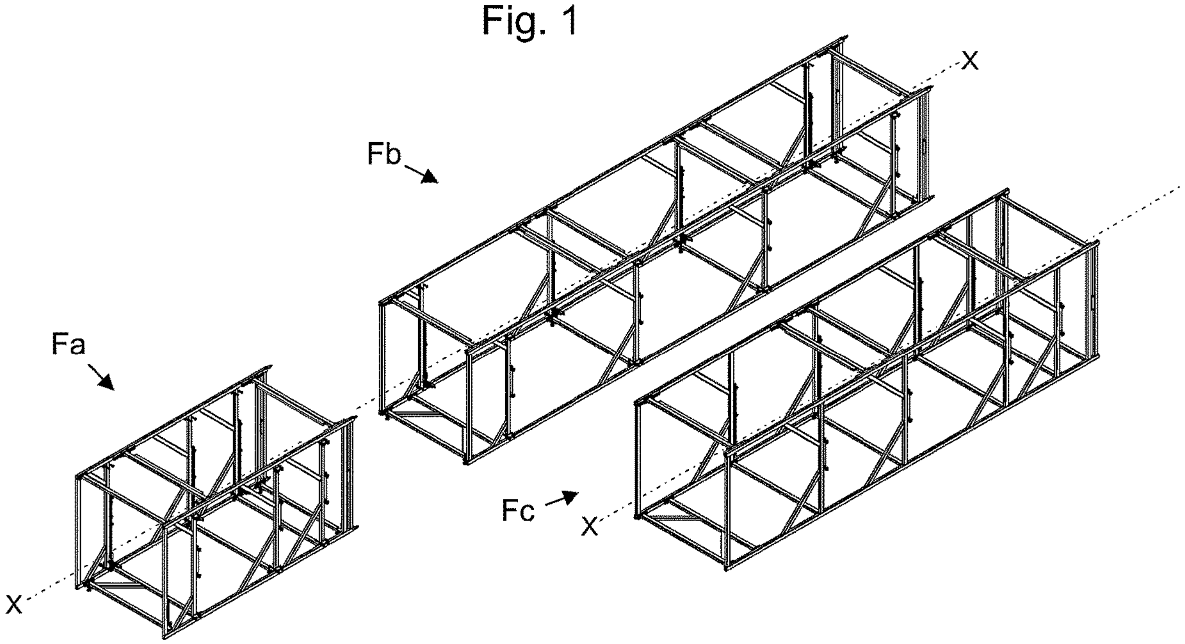
FIG. 1 illustrates a pit module frame, an intermediate module frame and a top module frame, each in horizontally oriented position.

Said fabricating plurality of elevator modules A,B,C comprises providing module frames Fa,Fb,Fc having a longitudinal axis X, as illustrated in FIG. 1. Each said module frame Fa,Fb,Fc is in the presented embodiment a beam frame comprising four corner beams 10*a*-10*c* for forming corner beams of the modules A,B,C. The corner beams 10*a*-10*c* extend in direction of the longitudinal axis X of the beam frame in question. Each said module frame Fa,Fb,Fc moreover comprises plurality of cross beams 11*a*,11*b*,11*c* connecting the corner beams 10*a*,10*b*,10*c* to each other. In the preferred embodiment, the beams are metal beams. The metal beams are preferably tubular metal beams. Hereby, the beam frame is rigid and light whereby large modules can be formed and lifted into place. This structure also reduces forces to be beared when piled, whereby a high pile of modules is possible. Preferably, the beams have one or more, preferably four planar side faces, whereby fixing elevator parts to them is facilitated.

In the preferred embodiment, said module frames Fa,Fb, Fc comprise a pit module frame Fa, at least one intermediate module frame Fb and a top module frame Fc.

The method comprises positioning one or more of the module frames Fa,Fb,Fc in horizontally oriented position (also referred to as horizontal position), where in said horizontally oriented position the longitudinal axis X of the module frame(s) in question is/are horizontal. In the method, installation work is performed on one or more module frames Fa,Fb,Fc;Fa,Fb;Fb,Fc while the one or more module frames Fa,Fb,Fc;Fa,Fb;Fb,Fc are in horizontal position, where in said horizontally oriented position the longitudinal axis X of the is module frame is horizontal. Horizontally oriented position facilitates performing the installation work efficiently, accurately and ergonomically. The module frame (s) to be worked on when in horizontal oriented position are easily accessible from various directions, including end directions and side directions so that installation work can be performed accurately, efficiently and ergonomically. In particular, this facilitates accuracy, efficiency and ergonomics of mounting of parts on the frame(s), adjustment of positions of beams of the frame(s), accurate alignment of parts to be fixed on the frame(s). Sides being accessible provides easy installation work from side direction. The ends being accessible provides easy installation work from end direction, enabling in particular connecting of module frames end to end during the fabricating phase and/or facilitating alignment work of parts of the module frame(s) or parts to be fixed thereon.

The installation work can be performed on a single module frame Fa,Fb,Fc;Fa,Fb;Fb,Fc while it is in horizontal position or two (or more) module fames while they are in horizontal position and connected end to end with each other. Preferred steps of the installation work are illustrated in FIGS. 2-16.

Figure 18:
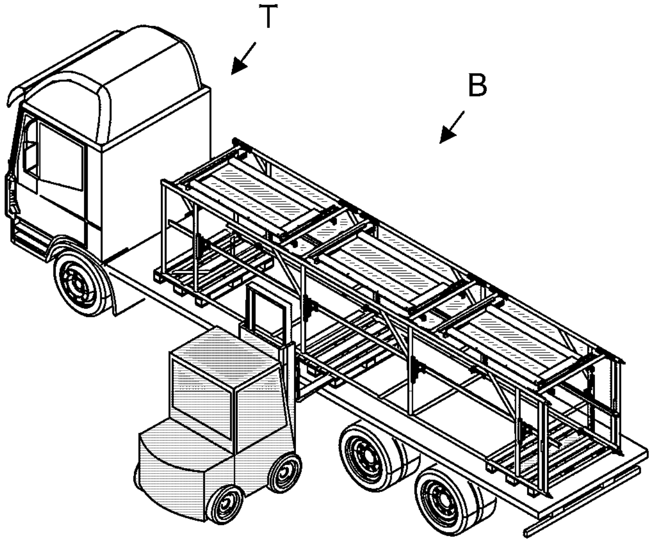
FIG. 18 illustrates loading a module on a truck for transportation.
Figure 19:
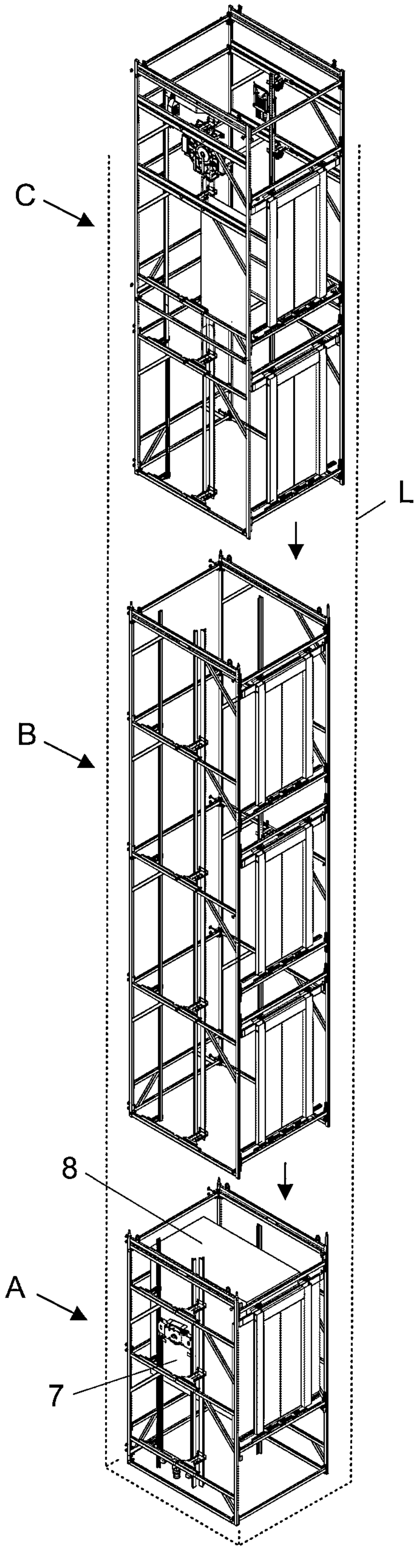
FIG. 19 illustrates arranging the modules into a destination location on top of each other such that each said modules are in vertically oriented position.

After fabricating of the plurality of elevator modules A,B,C, the modules A,B,C are transported to proximity of the destination location L, e.g. by trucks T illustrated in FIG. 18. Thereafter, the modules A,B,C are arranged into the destination location L on top of each other such that each said modules are in vertically oriented position (also referred to as vertical position, where in said vertically oriented position the longitudinal axes X of the module frames Fa,Fb,Fc of the modules A,B,C are vertical. This has been illustrated in FIGS. 19-20. Module frames are thus finally at a different angle than they were during the installation work. In the preferred embodiment, said elevator modules A,B,C comprise a pit module A comprising a pit module frame Fa, at least one intermediate module B comprising an intermediate module frame Fb and a top module C comprising a top module frame Fc. As illustrated in FIG. 19, in said arranging the modules A,B,C are arranged into the destination location L on top of each other such the at least one intermediate module B is/are on top of the pit module A and the top module C is on top of the at least one intermediate module B.

In the following, fabricating of the plurality of elevator modules A,B,C is described in a more detailed manner referring to FIGS. 2-16.

Figure 2:
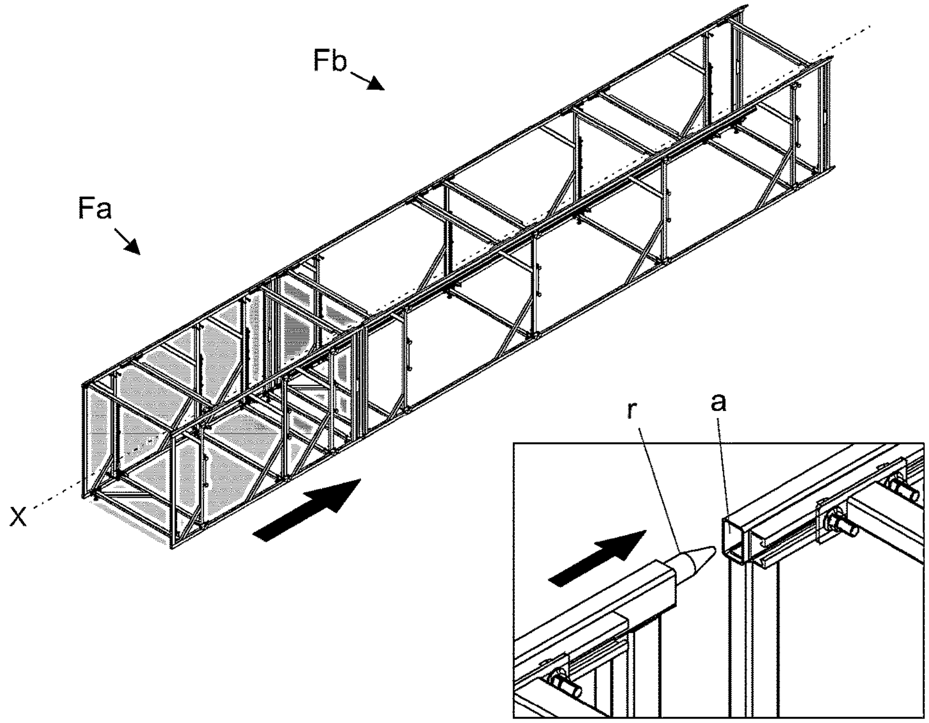
FIG. 2 illustrates connecting to each other a pit module frame and an intermediate module frame of FIG. 1 end to end while they are in horizontal position.

As illustrated in FIG. 2, in the preferred embodiment, the fabricating comprises positioning two module frames Fa,Fb, in this case a pit module frame Fa and an intermediate module frame Fb in horizontally oriented position, and thereafter connecting to each other said two module frames Fa,Fb end to end while they are in horizontal position. After said connecting, installation work is performed on one or both of said two module frames Fa,Fb while they are in horizontal position and connected end to end to each other.

FIGS. 3-7 illustrate preferred steps of said installation work. Performing installation work on one or both of said two module frames Fa,Fb while they are connected is advantageous, because thus the installation work on a module frame can be made in context where another module frame is present as it is intended to be also in the final configuration to be constructed. Hereby, for instance the parts of the module frames Fa,Fb and parts to fixed on them can be positioned accurately relative to each other at an early stage and adjustment work required to be done at the site is reduced.

Figure 3:
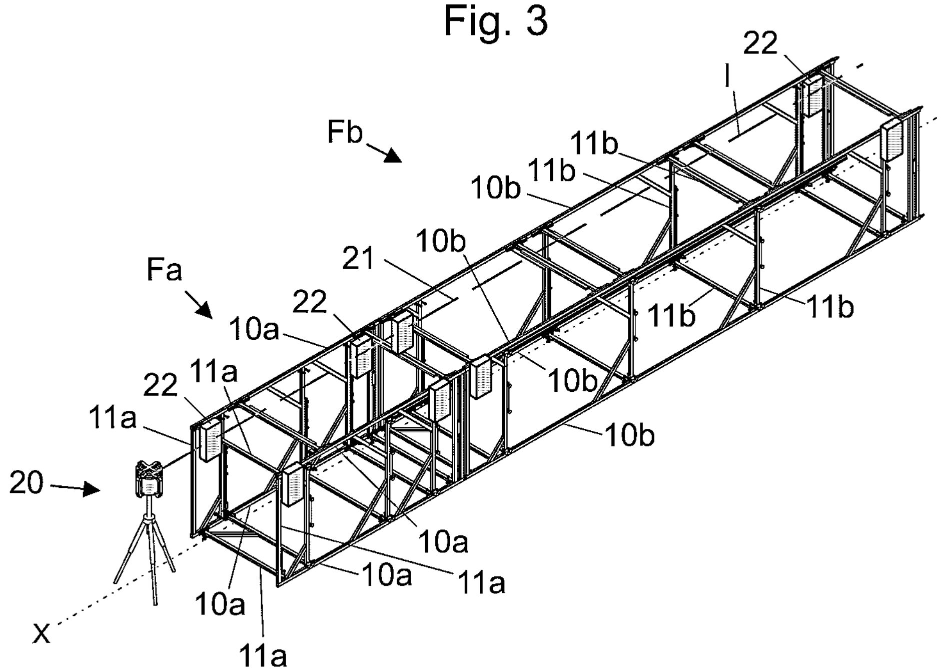
FIG. 3 illustrates adjusting position of corner beams by aid of a laser ray.
Figure 4:
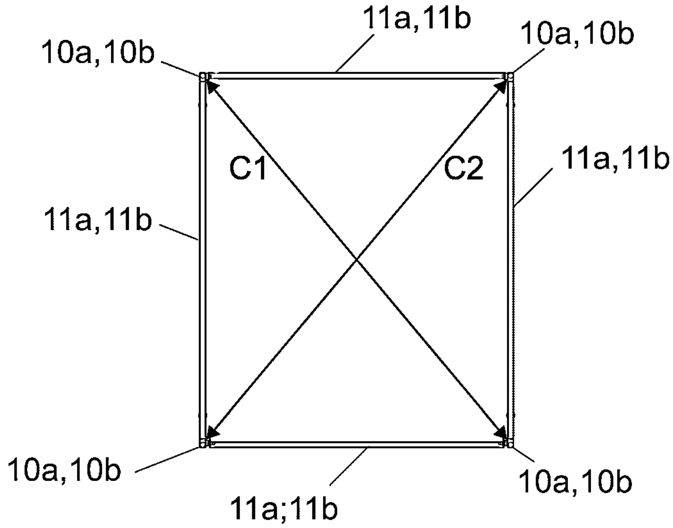
FIG. 4 illustrates adjusting positions of corner beams such that cross dimensions of corner beams are changed.

In FIGS. 3 and 4, this installation work performed on one or both of said two module frames Fa,Fb while they are in horizontal position and connected comprises adjusting positions of corner beams 10*a*-10*c* of the pit module frame Fa relative to each other and relative to corner beams 10*a*-10*c* of the intermediate module frame Fb connected to the pit module frame Fa and/or vice versa. For enabling adjustment, fixings between one or more beams 10*a*-10, 11*a*-11*c* of an individual module frame Fa,Fb are released and fixed again.

In FIGS. 3 and 4, said adjusting positions of corner beams 10*a*-10*c* is performed such that corner beams 10*a*-10*c* of the pit module frame Fa become aligned with corner beams 10*a*-10*c* of the intermediate module frame Fb connected to the pit module frame Fa.

In FIG. 3, said adjusting positions of corner beams 10*a*-10*c* comprises adjusting position of corner beams 10*a*-10*c*, in particular by aid of a laser ray 21, such that corner beams become parallel or within a tolerance away from parallel. More specifically, the method comprises providing a laser device 20 and mounting laser receiver parts 22 in line on successive corner beams 10-10*c* and emitting a laser ray 21 with the laser device 20 and adjusting position of one or both of the successive corner beams such that the laser ray 21 hits the laser receiver parts 22 to the corresponding location or at least within a tolerance from corresponding location. The laser device 20 is preferably positioned in front of an end of a module frame Fa so as to emit a laser ray 21 from end direction of the module frames Fa,Fb.

In FIG. 4, said adjusting positions of corner beams 10*a*-10*c* is performed such that cross dimensions C1 and C2 of corner beams 10*a*-10*c* of a module frame Fa and/or Fb are changed, most preferably such that their length difference is reduced, wherein each cross dimension is the distance between diagonally opposing corner beams.

Figure 5:
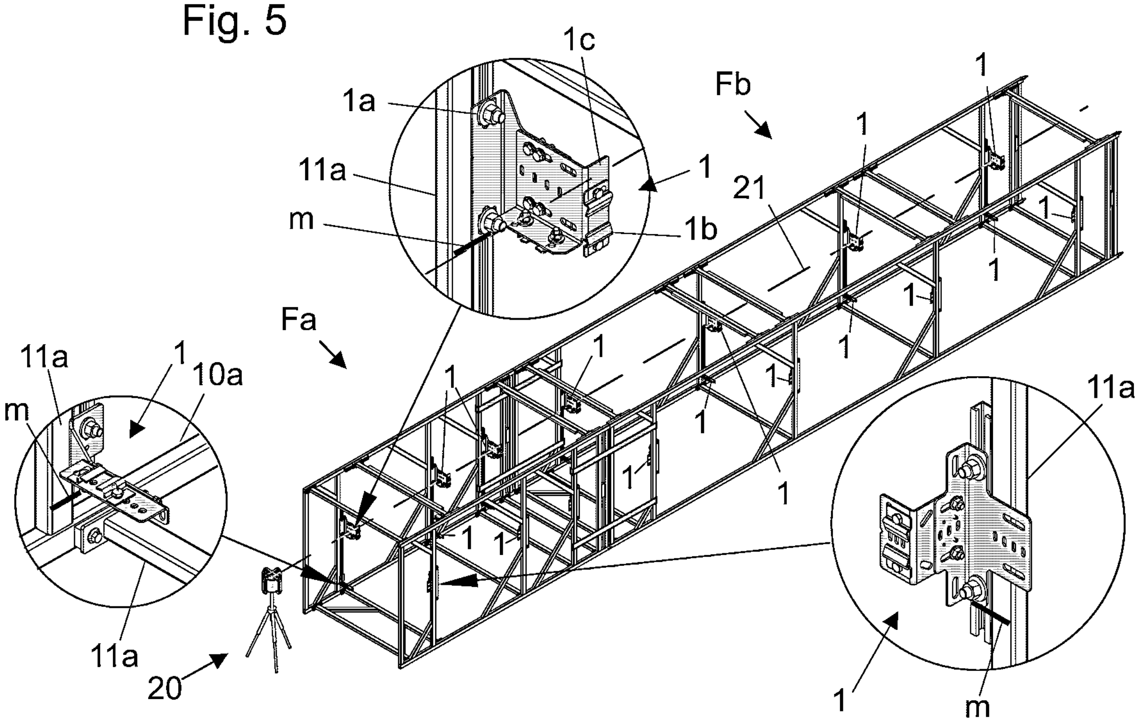
FIG. 5 illustrates fixing of guide rail brackets on two module frames while they are in horizontal position and connected end to end to each other.
Figure 6:
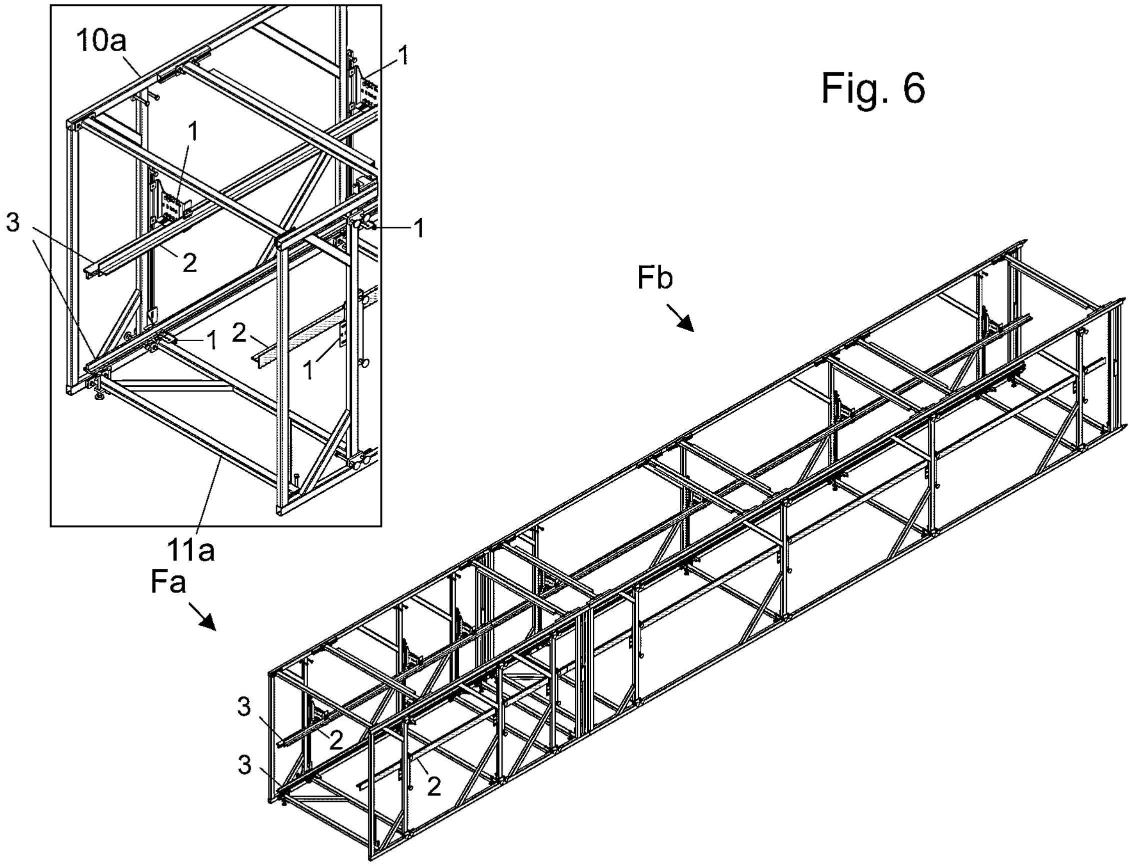
FIG. 6 illustrates fixing of guide rails on two module frames while they are in horizontal position and connected end to end to each other.
Figure 7:
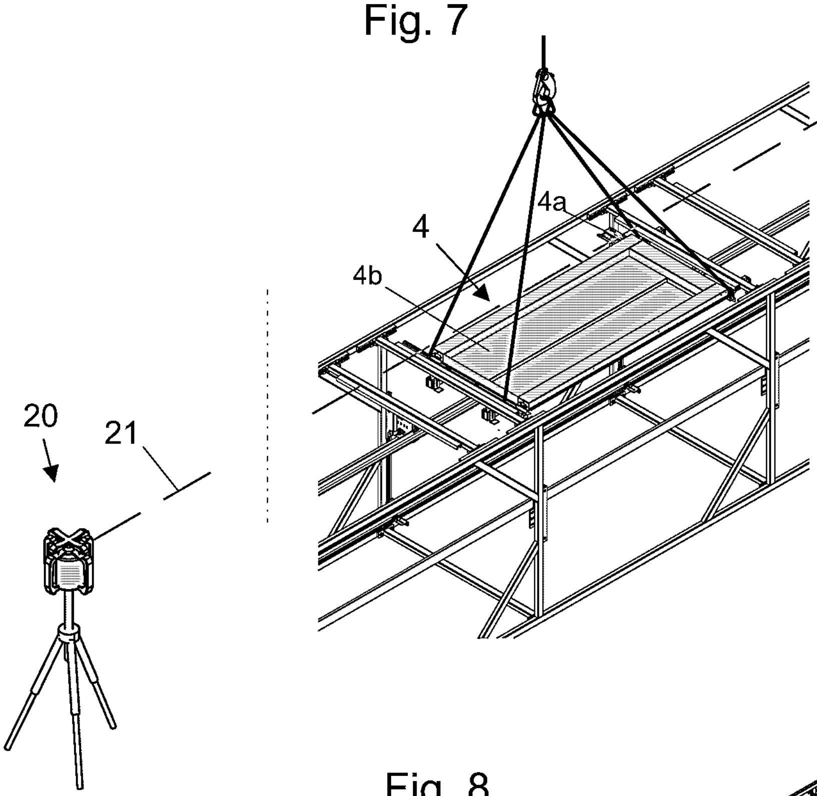
FIG. 7 illustrates fixing of door structures on two module frames while they are in horizontal position and connected end to end to each other.

In FIGS. 5-7, the installation work performed on one or both of said two module frames Fa,Fb while they are in horizontal position and connected end to end to each other comprises fixing to at least one of the module frames Fa,Fb elevator parts 1,2,3,4,4*a*,4*b*,5*b* such that they are aligned with corresponding elevator parts 1,2,3,4,4*a*,4*b*,5*b* fixed to another module frame Fa,Fb;Fb,Fc connected to the module frame Fa,Fb;Fb,Fc in question. Said elevator parts 1,2,3,4, 4*a*,4*b* include one or more of: guide rail brackets 1 for guide rails 2 and/or 3; car guide rails 2; counterweight guide rails 3; landing door structures 4, in particular landing door frame parts 4*a* and/or landing door leaves 4*b*. Examples of these are illustrated in FIGS. 5-7.

In FIG. 5, guide rail brackets 1 for guide rails 2 and/or 3 are fixed to a module frame Fa such that they are aligned with corresponding elevator parts i.e. guide rail brackets 1 for guide rails 2 and/or 3 fixed to module frame Fb connected to the module frame Fa,Fb;Fb,Fc in question. This is performed by aid of a laser device 20 emitting a laser ray 21. This can be implemented in various ways, but in the example of FIG. 5 this is performed such that aligned markings m are made on the module frames Fa and Fb to plurality of positions for indicating intended locations of brackets 1 to be fixed on the frames Fa and Fb. Thereafter brackets 1 can be fixed to these locations indicated by markings m whereby they will be fixed in alignment as above mentioned. Alternative ways to align the corresponding parts can be used. For example, the brackets 1 to be aligned could be first prefixed to both module frames F1,Fb roughly in alignment and thereafter adjusted to be aligned by aid of a laser ray 21. The laser device 20 is preferably positioned in front of an end of a module frame Fa so as to emit a laser ray 21 from end direction of the module frames Fa,Fb.

In the illustrated example, each said bracket 1 is fixable to a module frame, preferably by tightenable fixing means 1*a*, such as screwable fixing means. A guide rail 2,3 is preferably fixable to each said bracket 1, e.g. by fixing nails 1*b* tightenable for pressing the guide rail 2,3 against a back plate 1*c* comprised in the bracket 1.

In FIG. 6, guide rails 2 and 3 are fixed to a module frame Fa such that they are aligned with corresponding elevator parts (i.e. guide rails 2 and 3) fixed to module frame Fb connected to the module frame Fa. Alignment results in this case of aligned positioning of brackets 1. However, this fixing could alternatively be performed by aid of a laser device 20 emitting a laser ray 21, in particular such that each guide rail could be individually adjusted to be aligned according to a laser ray. This would be advantageous for example if one would for some reason choose to omit the accurate alignment step of brackets 1.

In FIG. 7, landing door structures 4, in particular landing door frame parts 4*a* and/or landing door leaves 4*b* are fixed to a module frame Fa such that they are aligned with landing door structures 4, in particular landing door frame parts 4*a* and/or landing door leaves 4*b* fixed to module frame Fb connected to the module frame Fa. This is performed by aid of a laser device 20 emitting a laser ray 21. This can be implemented in various ways, but in the example of FIG. 7 this is performed such that a door frame part 4*a* of landing is individually adjusted to be aligned according to a laser ray 21 and thereafter fixed to a module frame Fa,Fb. Alignment of landing door leaves 4*b* of successive landings results in this case of aligned positioning of frame parts 4*a* when these are fixed to the frame parts 4*a*. The laser device 20 is preferably positioned in front of an end of a module frame Fa so as to emit a laser ray 21 from end direction of the module frames Fa,Fb.

Figure 8:
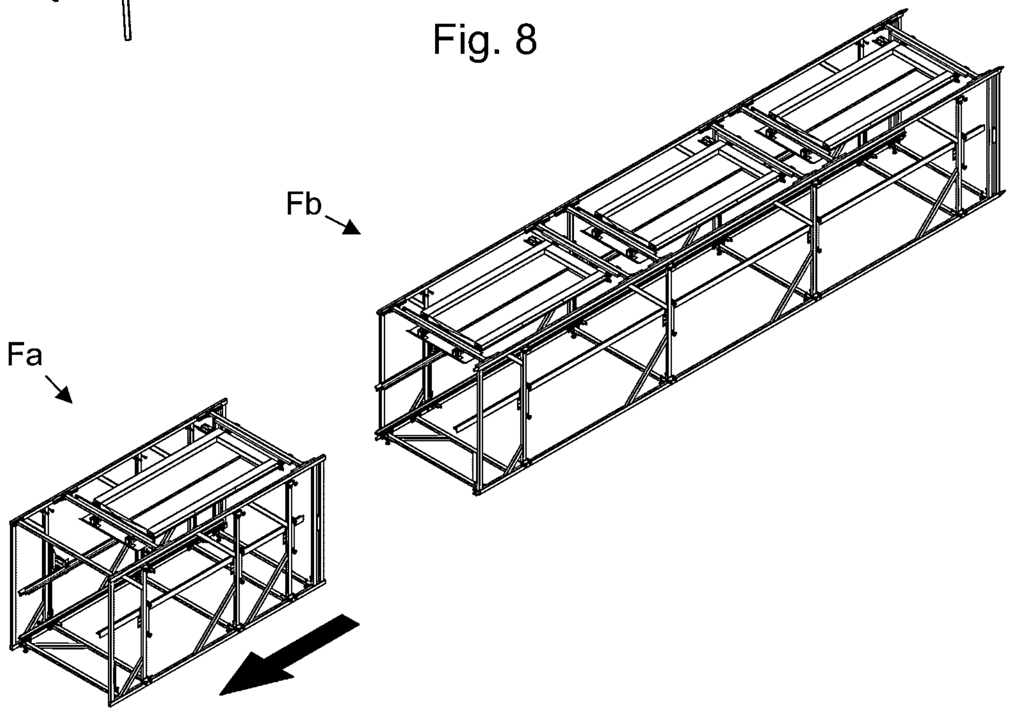
FIG. 8 illustrates disconnecting of the pit module frame and the intermediate module frame from each other after installation work has been performed on them while in horizontal position and connected end to end to each other.

As illustrated in FIG. 8, the fabricating comprises, after said installation work performed on one or both of said two module frames Fa,Fb while they are in horizontal position and connected end to end to each other, disconnecting said two module frames Fa,Fb; from each other.

Figure 9:
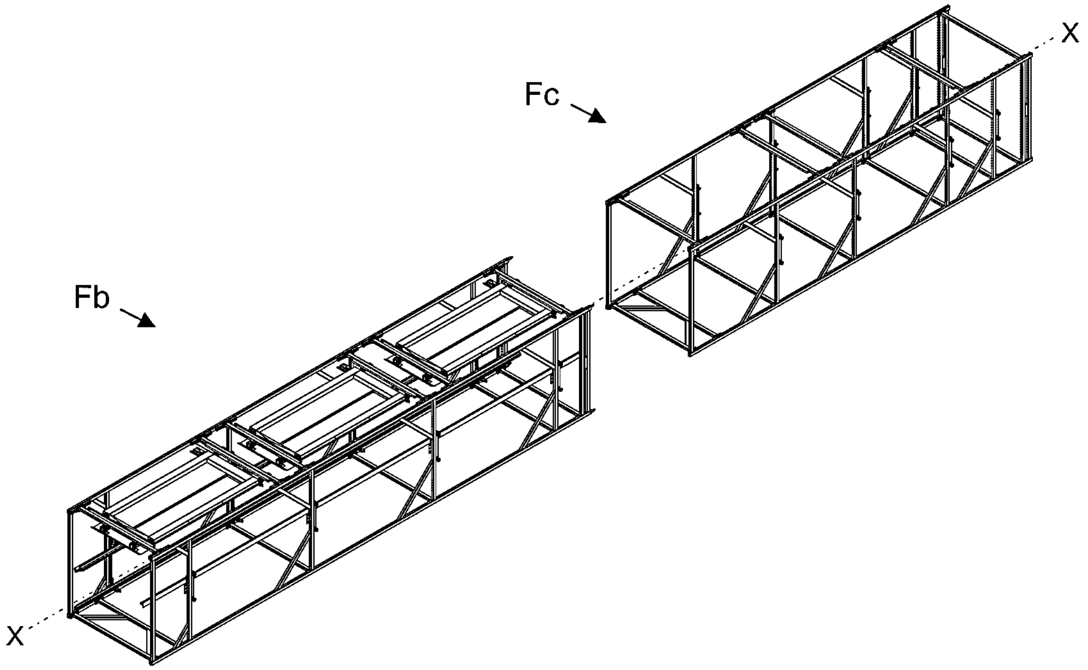
FIG. 9 illustrates an intermediate module frame and a top module frame each in horizontally oriented position.
Figure 10:
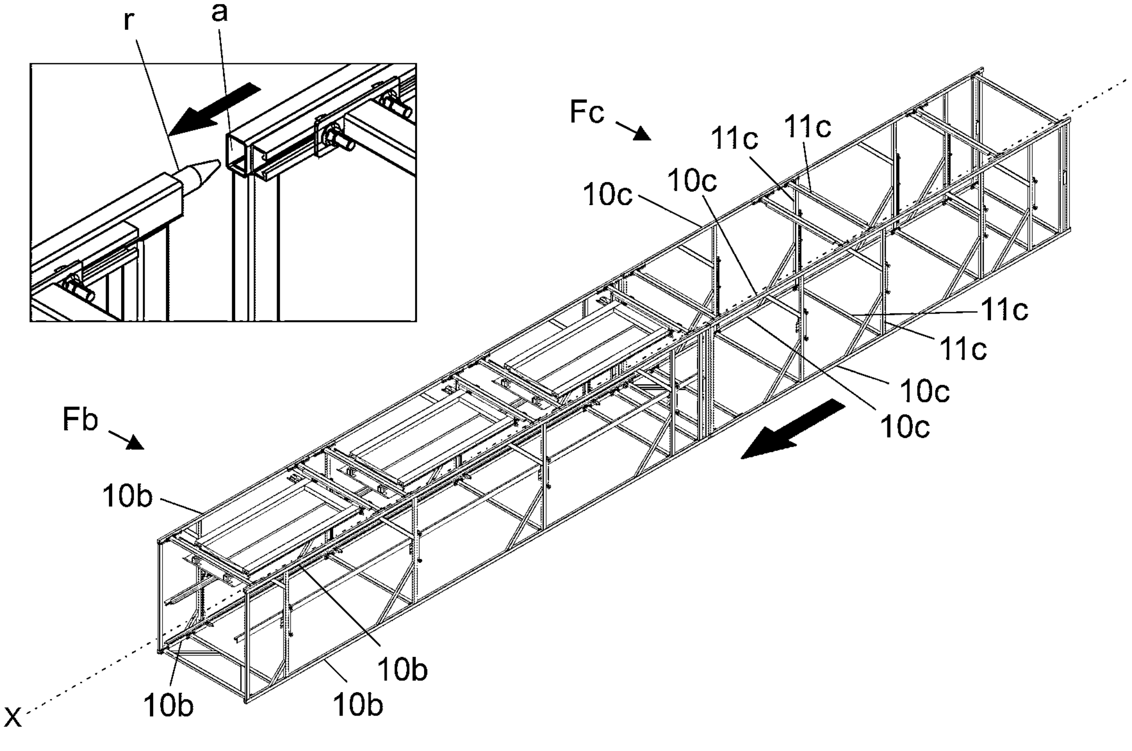
FIG. 10 illustrates connecting to each other the intermediate module frame and the top module frame of FIG. 9 end to end while they are in horizontal position.

In the above installation work performed on one or both of two module frames Fa,Fb while they are connected has been described referring to FIGS. 2-7 where the two module frames are a pit module frame Fa and an intermediate module frame Fb. The fabricating can additionally or alternatively comprise in corresponding manner installation work performed on one or both of two module frames Fb,Fc while they are connected where the two module frames are an intermediate module frame Fb and a top module frame Fc. FIGS. 9-10 illustrate this.

As illustrated in FIG. 9, here the fabricating comprises positioning two module frames Fb,Fc, which are in this case an intermediate module frame Fb and top module frame Fc, in horizontally oriented position, and thereafter connecting to each other said two module frames Fb,Fc end to end while they are in horizontal position as illustrated in FIG. 10. After said connecting, installation work is performed on one or both of said two module frames Fb,Fc while they are in horizontally oriented position and connected, which installation work is performed correspondingly as described referring to FIGS. 3-7. In particular, installation work performed on one or both of said two module frames Fb,Fc while they are in horizontally oriented position and connected preferably comprises

- adjusting positions of corner beams 10*c* of a module frame Fc relative to each other and/or relative to corner beams 10*b* of another module frame Fb connected to the module frame Fc; and/or
- fixing on at least one Fc of the module frames Fb,Fc elevator parts 1,2,3,4,4*a*,4*b*,5*b* such that they are aligned with corresponding elevator parts 1,2,3,4,4*a*, 4*b*,5*b* fixed to another module frame Fb connected to the module frame Fc in question, said elevator parts 1,2,3,4,4*a*,4*b* preferably including one or more of: guide rail brackets 1 for guide rails 2 and/or 3; car guide rails 2; counterweight guide rails 3; landing door structures 4, in particular landing door frame parts 4*a* and/or landing door leaves 4*b*; and/or
- making aligned markings m on the module frames Fb,Fc to plurality of positions for indicating intended locations of elevator parts 1,2,3,4,4*a*,4*b* to be fixed on the module frames Fb,Fc.

In the example of fabrication as illustrated in Figures is such that positions of corner beams 10*c* of frame modules Fa and Fb have been adjusted while they are connected, as well as elevator parts 1,2,3,4,4*a*,4*b*,5*b* have been installed on them while they are connected, already before corresponding installation work is to be focused on the top module frame Fc. Thus, the structure of and the parts fixed to the intermediate module frame Fb can be used as a reference for installation work to be performed on the top module frame Fc. Thus, it is advantageous that in the example illustrated in FIGS. 9-10, said fixing and adjusting are not performed on both module frames Fb,Fc but only on parts 1,2,3,4,4*a*,4*b*,5*b* to be fixed to the top module frame Fc and the corner beams of the top module frame Fc. Thus, the structure of and the parts fixed to the top module frame Fc can be brought into line with those of the other module frames Fa,Fb.

Figure 11:
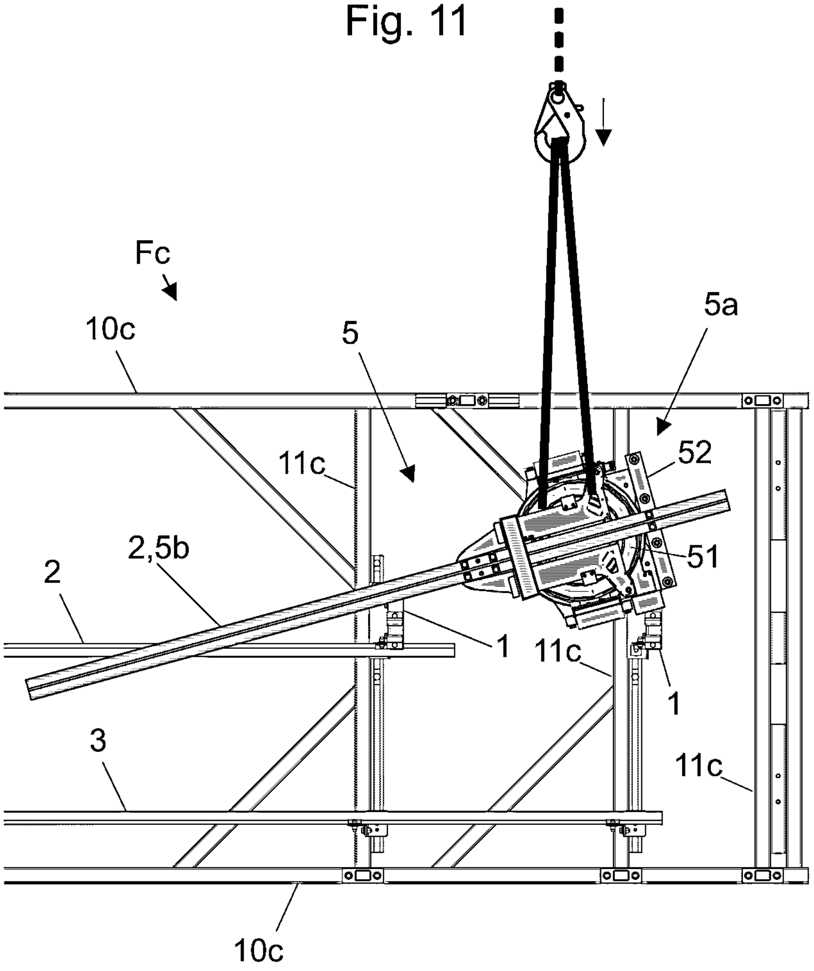
FIG. 11 illustrates fixing on the top module frame while it is in horizontal position a hoisting machine unit.
Figure 12:
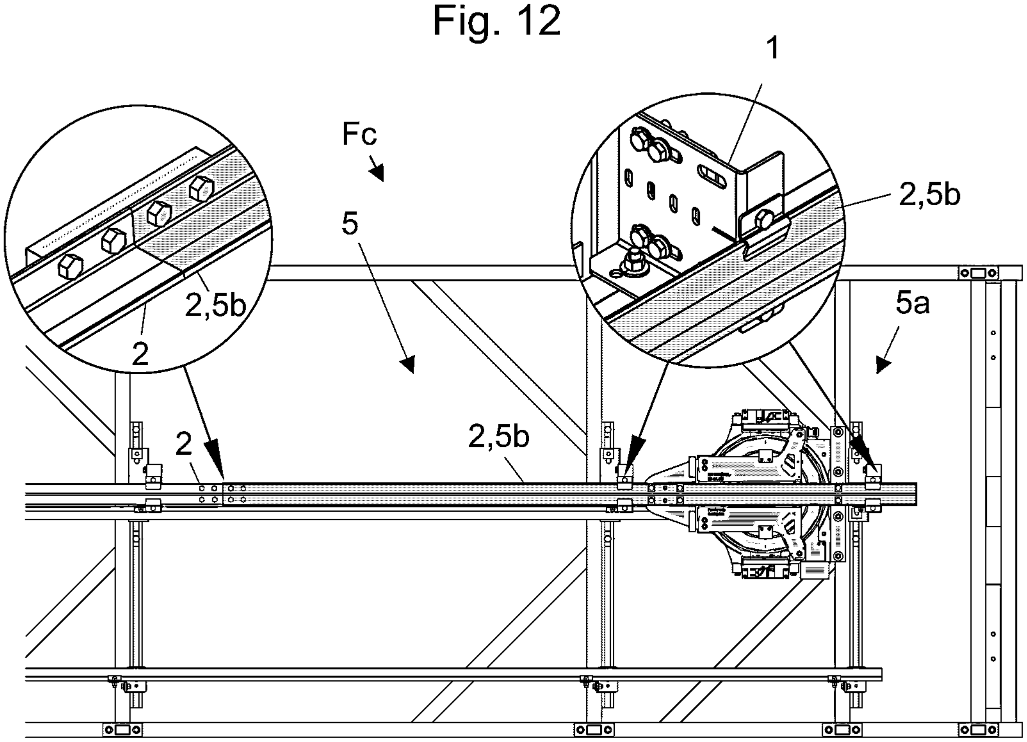
FIG. 12 illustrates details of the top module frame and the hoisting machine unit fixed thereon.

As illustrated in FIGS. 11 and 12, the installation work performed on said one or more module frames Fa,Fb,Fc;Fa, Fb;Fb,Fc while in horizontal position preferably also comprises fixing on a module frame Fc while it is in horizontal position a hoisting machine unit 5, which comprises a car guide rail section 5*b* and a hoisting machine 5*a* mounted on the car guide rail section 5*b*. The hoisting machine 5*a* comprises a drive sheave 51 for engaging hoisting ropes 9 and an electric motor 52 for driving the drive sheave 51. The fixing is performed by aid of brackets 1 fixed to the top module frame Fc. At the time of fixing of the hoisting machine unit 5 on the module frame Fc the module frame Fc is in horizontal position. It may also be connected at the time of fixing end to end to an intermediate module frame Fb, but this is not necessary. For example, the brackets 1 of the top module frame Fc can be earlier aligned which results in proper positioning of the hoisting machine unit 5 and/or the positioning thereof can be later corrected. The hoisting machine 5*a* of the hoisting machine unit 5 being mounted on the car guide rail section 5*b* provides that the hoisting machine 5*a* will be accurately positioned when the guide rail section 5*b* is accurately positioned. Thus, need of separate adjustment of the position of the hoisting machine 5*a* may be avoided.

The module frame Fc being in horizontal position provides that it is easily accessible from side direction, and the hoisting machine unit 5 can be simply hoisted and lowered to its intended position and fixed therein.

Figure 13:
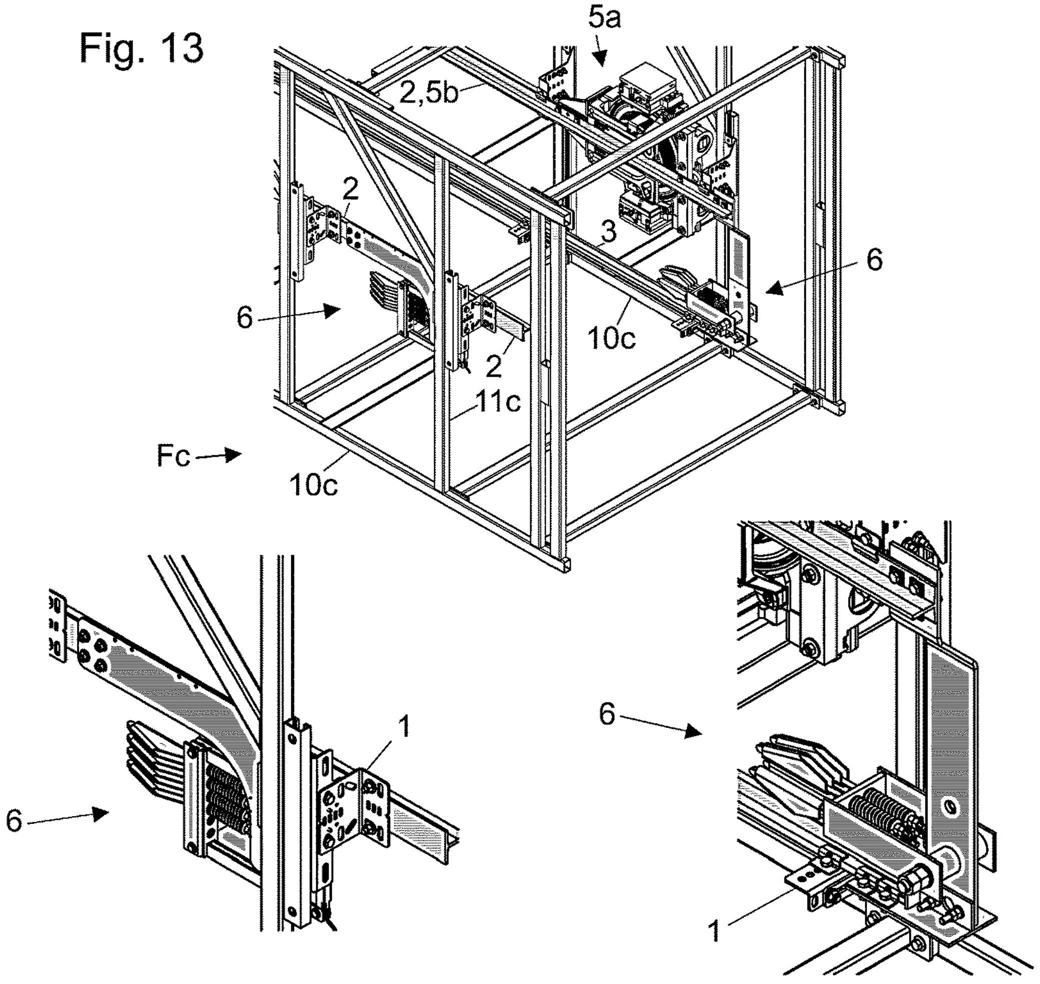
FIG. 13 illustrates fixing on the top module frame while it is in horizontal position rope end fixing brackets.

As illustrated in FIG. 13, the installation work performed on said one or more module frames Fa,Fb,Fc;Fa,Fb;Fb,Fc while in horizontal position preferably also comprises fixing on a module frame Fc while it is in horizontal position rope end fixing brackets 6. The fixing brackets 6 are suitable for supporting rope ends. They are also called by a more specific term rope hitch 6. At the time of fixing of the rope end fixing brackets 6 on the module frame Fc the module frame Fc is in horizontal position, and it may be connected end to end to an intermediate module frame Fb, but this is not necessary.

Figure 14:
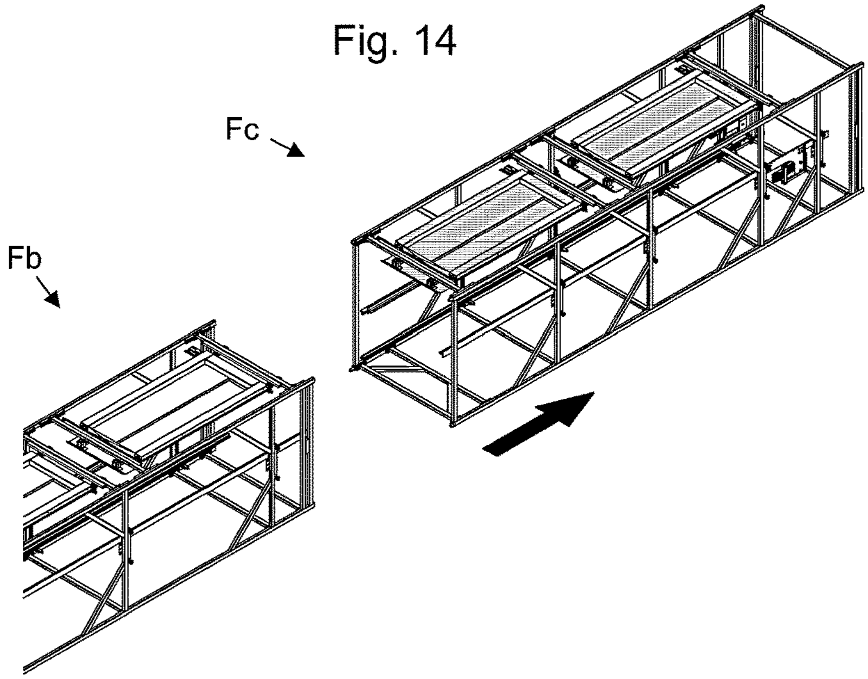
FIG. 14 illustrates disconnecting of the intermediate module frame and the top module frame from each other after installation work has been performed on them while in horizontal position and connected end to end to each other.

As illustrated in FIG. 14, the fabricating comprises, after said installation work performed on one or both of said two module frames Fb,Fc, i.e. the intermediate module frame Fb and the top module frame Fc, while they are in horizontal position and connected end to end to each other, disconnecting said two module frames Fb,Fc; from each other.

Figure 15:
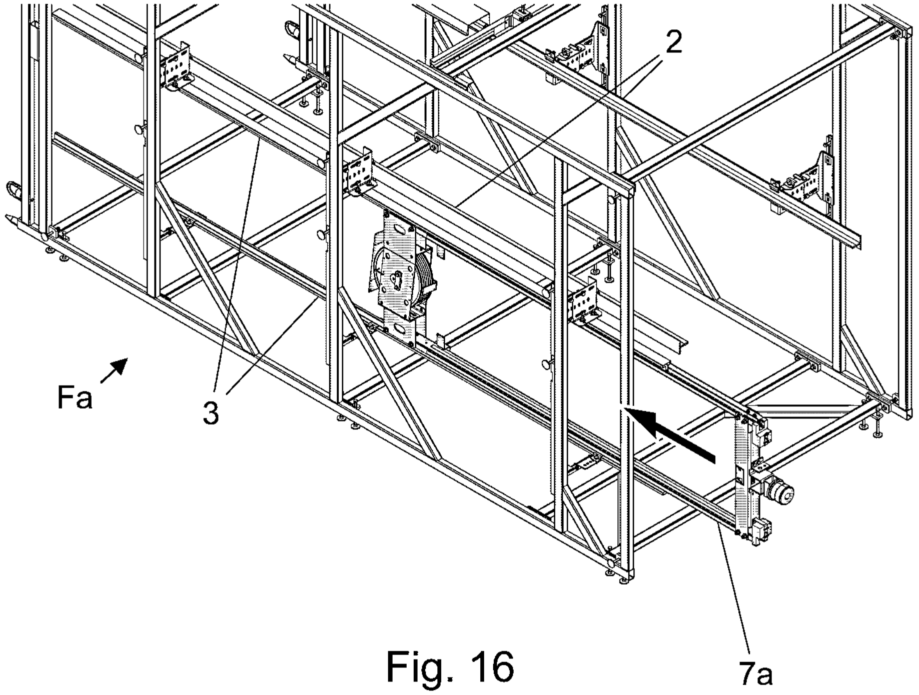
FIG. 15 illustrates mounting a counterweight frame on the pit module frame while in horizontal position.

As illustrated in FIG. 15, the installation work performed on said one or more module frames Fa,Fb,Fc;Fa,Fb;Fb,Fc while in horizontal position preferably also comprises mounting a counterweight frame 7*a* on the pit module frame Fa, in particular on guide rails 3 fixed to the module frame Fa, while the pit module frame Fa is in horizontal position. The weights of the counterweight 7 can be already mounted on counterweight frame 7*a* at this stage or they can be mounted on counterweight frame 7*a* at a suitable moment afterwards, which may be advantageous for making the mounting step of the counterweight frame 7*a* easier.

Figure 16:
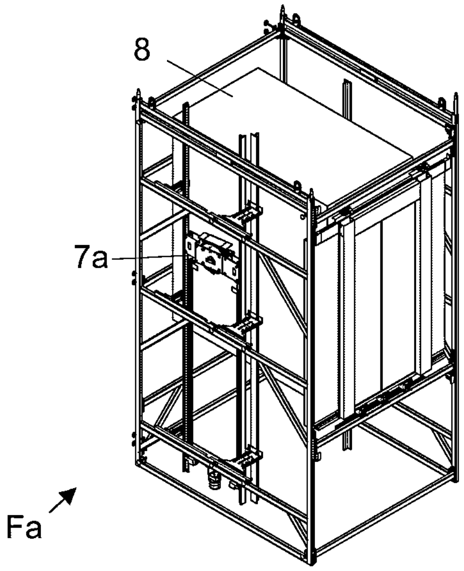
FIG. 16 illustrates assembling on the pit module frame, while it is in vertical position an elevator car, such that it is mounted on guide rails fixed to the pit module frame.

As illustrated in FIG. 16, the fabrication work comprises assembling on a module frame Fa), which is preferably the pit module frame Fa, while it is in vertical position an elevator car 8, such that it is mounted on guide rails 2 fixed to the module frame Fa. The elevator car 8 has an inside space for receiving passengers and/or goods, and comprises a doorway leading into the interior, as well as a door movable to open and close the doorway.

Generally preferably, each said connecting of two module frames Fa,Fb;Fb,Fc to each other end to end is performed by aid of shape-locking connecting means r,a as illustrated in FIGS. 2 and 12, which shape locking connecting means are at ends of the two module frames Fa,Fb;Fb,Fc to be connected. In the preferred embodiments illustrated in FIGS. 1 and 12, said shape locking means comprises rods r at an end of one of the module frames to be connected and protruding in direction of said longitudinal axis X of the module frame in question as well as apertures a at an end of the other of the module frames to be connected, which apertures a open in direction of said longitudinal axis X of the module frame in question. The rods r point towards the aforementioned apertures a, when the two module frames Fa,Fb;Fb,Fc to be connected are positioned their ends pointing towards each other. In said connecting, the two module frames Fa,Fb;Fb, Fc to be connected are moved towards each other in direction of their longitudinal axis X such that the rods enter the apertures. The rods r and apertures a are in the preferred embodiment positioned at the ends of the corner beams 10*a*-10*c* of the two module frames Fa,Fb;Fb,Fc to be connected.

Figure 17:
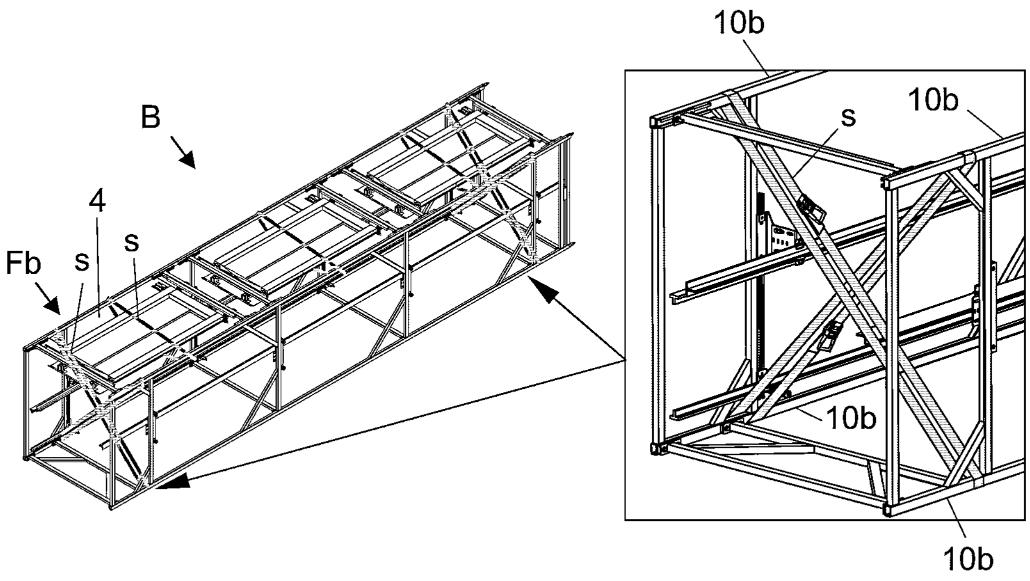
FIG. 17 illustrates preparation of modules for the time of transportation.

As illustrated in FIG. 17, the method preferably further comprises after fabrication of a module, and before transportation of the module:

- tying for the time of transportation elevator parts 1,2,3, 4,4*a*,4*b*,5*b* of the module to the module frame of the module with tying means s such as straps or braces for ensuring they are immovable relative to each other during transport; and/or
- tying for the time of transportation beams 10*a*-10*c* of the module to each other with tying means s such as straps or braces for ensuring they are immovable relative to each other during transport.

The transportation can be performed by trucks for example. As illustrated in FIG. 18, the method preferably then comprises before transportation of each module loading the module on a truck T for transportation.

FIG. 19 illustrates the arranging the modules A,B,C into the destination location L on top of each other such that each said modules are in vertically oriented position, where in said vertically oriented position the longitudinal axes A,B,C of the module frames Fa,Fb,Fc of the modules A,B,C are vertical. This is preferably performed such that the modules A,B,C are lifted by a crane into the destination location L, which is preferably a space inside a building, for instance.

In said arranging, the modules A,B,C are arranged into the destination location L on top of each other such that the corner beams 10*a*-10*c* of each module A,B,C are aligned with corner beams 10*a*-10*c* of other modules A,B,C, the corner beams 10*c* of the top module C resting on the corner beams 10*b* of an intermediate module B, and the corner beams 10*b* of an intermediate module B resting on the corner beams 10*a* of the pit module A.

The arranging preferably comprises connecting successive modules A,B;B,C to each other, comprising reconnecting to each other the two module frames Fa,Fb;Fb,Fc end to end while they are in vertical position, which two module frames Fa,Fb;Fb,Fc were earlier connected during fabricating of the plurality modules A-C. Thus, owing to the earlier installation work performed on them earlier while they were connected, the positioning of the beams of the module frames and/or the parts fixed to them will be straightaway such well positioned that installation time at the site is reduced. The reconnecting is particularly performed by aid of the shape locking connecting means r,a of the module frames Fa,Fb;Fb,Fc to be connected.

The arranging preferably comprises fixing the module frames Fa,Fb,Fc to a wall w, such as a building wall w. This is preferably implemented by brackets 23. The building wall w can be such that it delimits a space inside the building, for instance. The space is preferably tubular.

Figure 20:
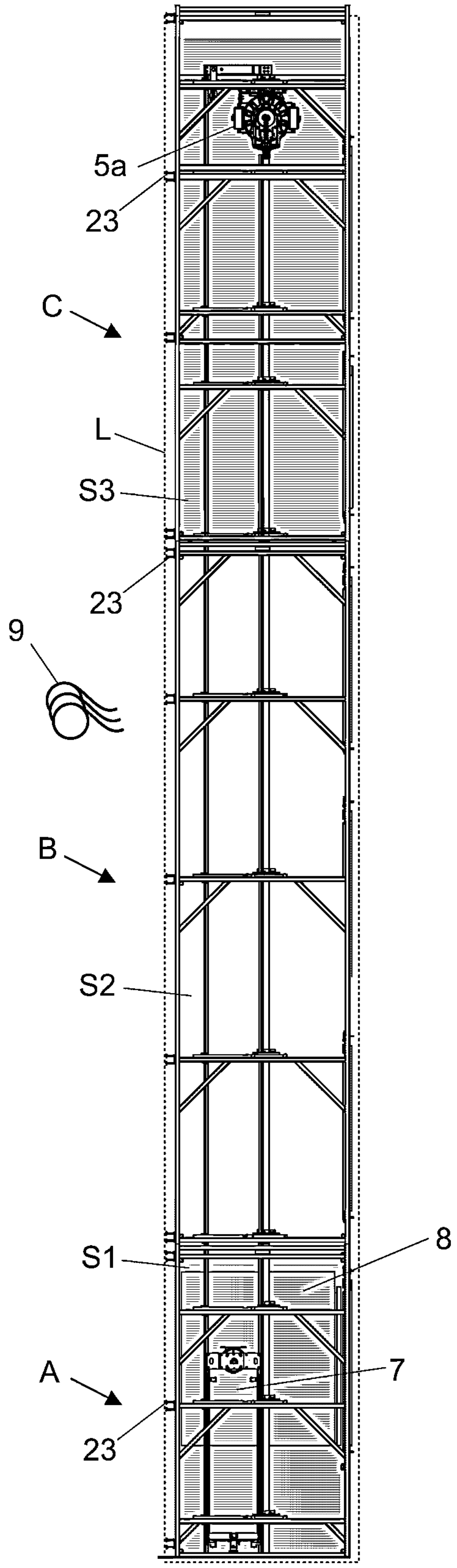
FIG. 20 illustrates the modules arranged into the destination location on top of each other.

FIG. 20 illustrates the modules A-C arranged into the destination location L on top of each other as described earlier. After said arranging, the method comprises roping the elevator, particularly such that a car 8 and counterweight 7 are suspended by hoisting ropes 9, which pass around a drive sheave 51 of the hoisting machine 5*a*. The hoisting ropes 9 can be arranged to suspend the car and counterweight with 2:1 suspension ratio or any other suspension ratio, such as 1:1 for example.

Generally preferably, the cross beams 11*a*,11*b*,11*c* extend at right angle relative to the corner beams 10*a*,10*b*,10*c*. Generally preferably, each corner beam 10*a*, 10*b*,10*c* is connected to (each of) two other corner beams 10*a*, 10*b*, 10*c* by at least two cross beams 11*a*,11*b*,11*c*. Preferably, each said module frame Fa,Fb,Fc comprises one or more diagonal beams each diagonal beam connecting a cross beam and a corner beam, and extending in the plane of the cross beam and a corner beam at an angle 20-70 deg relative to both of the beams it connects.

In general when referring to alignment, alignment is preferably considered to exist if parts are within tolerance +−N millimeters from a straight line (e.g. the laser ray 21). Said N is preferably smaller than 2, most preferably 1, whereby the tolerance is preferably smaller than +−2 mm, most preferably +−1 mm.

In general, in the preferred embodiments each of said elevator modules A,B,C, when they are on top of each other, forms a section of an elevator hoistway. More specifically, the intermediate elevator B module forms a hoistway space S2 into and through which the whole elevator car 8 can be moved, the top module C forms a hoistway space S3 into which the whole elevator car 8 or alternatively at least the upper end thereof can be moved and the pit module A forms a hoistway space S1 into which the whole elevator car 8 or alternatively at least the lower end thereof can be moved.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for constructing an elevator into a destination location from a plurality of prefabricated elevator modules, the method comprising:

fabricating the plurality of prefabricated elevator modules, said fabricating comprising the steps of:

providing one or more module frames having a longitudinal axis;

positioning one or more of the module frames in a horizontally oriented position, wherein in said horizontally oriented position the longitudinal axis is horizontal; and while the one or more module frames are in the horizontal position, performing installation work on said one or more module frames;

transporting the elevator modules to a proximity of the destination location; and arranging the elevator modules into the destination location on top of each other such that said elevator modules are in a vertically oriented position, wherein in said vertically oriented position the longitudinal axes of the module frames of the elevator modules are vertical, wherein the installation work comprises adjusting positions of corner beams of a module frame relative to each other and/or relative to corner beams of another module frame connected to the module frame in question, and wherein said adjusting positions of corner beams is performed such that cross dimensions of corner beams of a module frame are changed.

2. The method according to claim 1, wherein in said positioning, two of the module frames are positioned in the horizontally oriented position, and the fabricating comprises thereafter connecting to each other said two module frames end to end while they are in the horizontal position, and thereafter installation work is performed on one or both of said two module frames while they are in the horizontal position and connected.

3. The method according to claim 2, wherein the installation work on one or both of said two module frames while they are in the horizontal position and connected comprises fixing on at least one of the module frames elevator parts such that they are aligned with corresponding elevator parts fixed to another module frame connected to the module frame in question.

4. The method according to claim 3, wherein said elevator parts include one or more of: guide rail brackets for guide rails; car guide rails; counterweight guide rails; and landing door structures.

5. The method according to claim 3, wherein said fixing is performed by aid of a laser device emitting a laser ray.

6. The method according to claim 2, wherein connecting of two module frames to each other end to end is performed by aid of shape-locking connectors, the shape-locking connectors being at ends of the two module frames to be connected.

7. The method according to claim 1, wherein each said module frame is a beam frame, each said module frame comprising four corner beams.

8. The method according to claim 7, wherein each said module frame comprises cross beams connecting the corner beams to each other.

9. The method according to claim 1, wherein each said module frame comprises cross beams connecting the corner beams to each other.

10. The method according to claim 1, wherein the arranging comprises connecting successive modules to each other, comprising reconnecting to each other two module frames of said one or more module frames end to end while they are in the vertical position, which two module frames were earlier connected during fabricating of the plurality of elevator modules.

11. The method according to claim 1, wherein said module frames comprise a pit module frame, at least one intermediate module frame and a top module frame, and said elevator modules comprise a pit module comprising a pit module frame, at least one intermediate module comprising an intermediate module frame and a top module comprising a top module frame, and in said arranging the elevator modules are arranged into the destination location on top of each other such the at least one intermediate module is/are on top of the pit module and the top module is on top of the at least one intermediate module.

12. The method according to claim 1, wherein said adjusting positions of corner beams comprises adjusting position of one or more corner beams such that they become parallel or within a tolerance away from parallel.

13. The method according to claim 1, wherein said adjusting positions of corner beams is performed by aid of a laser device emitting a laser ray.

14. The method according to claim 1, wherein the installation work comprises fixing on a module frame while the module frame is in the horizontal position one or more of:

a hoisting machine unit comprising at least a hoisting machine and a car guide rail section, the hoisting machine comprising a drive sheave for engaging hoisting ropes and an electric motor for driving the drive sheave; and/or rope end fixing brackets.

15. The method according to claim 1, wherein the fabricating comprises assembling on a module frame, while the module frame is in the vertical position, an elevator car, such that the elevator car is mounted on guide rails fixed to the module frame.

16. The method according to claim 1, wherein the method comprises after said arranging, roping the elevator.

17. A method for constructing an elevator into a destination location from a plurality of prefabricated elevator modules, the method comprising:

fabricating the plurality of prefabricated elevator modules, said fabricating comprising the steps of:

providing one or more module frames having a longitudinal axis;

positioning one or more of the module frames in a horizontally oriented position, wherein in said horizontally oriented position the longitudinal axis is horizontal; and while the one or more module frames are in the horizontal position, performing installation work on said one or more module frames;

transporting the elevator modules to a proximity of the destination location; and arranging the elevator modules into the destination location on top of each other such that said elevator modules are in a vertically oriented position, wherein in said vertically oriented position the longitudinal axes of the module frames of the elevator modules are vertical, wherein in said positioning, two of the module frames are positioned in the horizontally oriented position, and the fabricating comprises thereafter connecting to each other said two module frames end to end while they are in the horizontal position, and thereafter installation work is performed on one or both of said two module frames while they are in the horizontal position and connected, and wherein the installation work performed on one or both of said two module frames while they are in the horizontal position and connected comprises making aligned markings on the module frames to plurality of positions for indicating intended locations of parts to be fixed on the module frames.

18. A method for constructing an elevator into a destination location from a plurality of prefabricated elevator modules, the method comprising:

fabricating the plurality of prefabricated elevator modules, said fabricating comprising the steps of:

providing one or more module frames having a longitudinal axis;

positioning one or more of the module frames in a horizontally oriented position, wherein in said horizontally oriented position the longitudinal axis is horizontal; and while the one or more module frames are in the horizontal position, performing installation work on said one or more module frames;

transporting the elevator modules to a proximity of the destination location; and arranging the elevator modules into the destination location on top of each other such that said elevator modules are in a vertically oriented position, wherein in said vertically oriented position the longitudinal axes of the module frames of the elevator modules are vertical, wherein the installation work comprises mounting a counterweight frame on a module frame, while the module frame is in the horizontal position.

* * * * *